United States Patent [19]

Iwashita et al.

[11] Patent Number: 5,986,422
[45] Date of Patent: *Nov. 16, 1999

[54] CONTROL MODE CHANGING OVER METHOD FOR SERVO CONTROL SYSTEM

[75] Inventors: Yasusuke Iwashita; Tadashi Okita, both of Oshino-mura, Japan

[73] Assignee: Fanuc Limited, Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/836,427

[22] PCT Filed: Sep. 2, 1996

[86] PCT No.: PCT/JP96/02471

§ 371 Date: Apr. 29, 1997

§ 102(e) Date: Apr. 29, 1997

[87] PCT Pub. No.: WO97/08599

PCT Pub. Date: Mar. 6, 1997

[30] Foreign Application Priority Data

Aug. 31, 1995 [JP] Japan ..................... 7-245107

[51] Int. Cl.$^6$ .................................................. G05B 19/10
[52] U.S. Cl. ............................................................ 318/567
[58] Field of Search ..................... 318/432, 433, 318/434, 609, 610, 568.2, 590, 567

[56] References Cited

U.S. PATENT DOCUMENTS

| 3,946,297 | 3/1976 | Bechtel . | |
|---|---|---|---|
| 4,458,189 | 7/1984 | Dollerschell . | |
| 4,672,844 | 6/1987 | Meyer | 73/118.1 |
| 4,884,597 | 12/1989 | Tamura et al. | 139/102 |
| 4,904,152 | 2/1990 | Doi et al. . | |
| 5,144,211 | 9/1992 | Daggett et al. | 318/568.11 |
| 5,204,602 | 4/1993 | Iwashita . | |
| 5,297,071 | 3/1994 | Sugino | 364/736 |
| 5,585,708 | 12/1996 | Richardson et al. | 318/800 |

FOREIGN PATENT DOCUMENTS

| 44 09 823 | 1/1995 | Germany . |
|---|---|---|
| 48-41210 | 6/1973 | Japan . |
| 4-137017 | 5/1992 | Japan . |
| 4-203603 | 7/1992 | Japan . |
| 5-252773 | 9/1993 | Japan . |
| 6-190889 | 7/1994 | Japan . |

Primary Examiner—William M. Shoop, Jr.
Assistant Examiner—Kim Lockett
Attorney, Agent, or Firm—Staas & Halsey

[57] ABSTRACT

A control mode changing over method for a servo control system, which is capable of reducing a shock occurring in changing over a control mode from a torque control mode to a position/velocity control mode. In the torque control mode, a value of an integrator in a velocity loop for the position/velocity control mode is rewritten into a torque command value for torque control so that the value of the integrator is always set to the same value as the torque command. When a control mode is changed over from the torque control mode to the position/velocity control mode, a torque command value for a servo motor is obtained based on the value of the integrator rewritten in the torque control mode. Thus, a continuous torque command value is given to the servo motor in changing over the control mode.

5 Claims, 5 Drawing Sheets

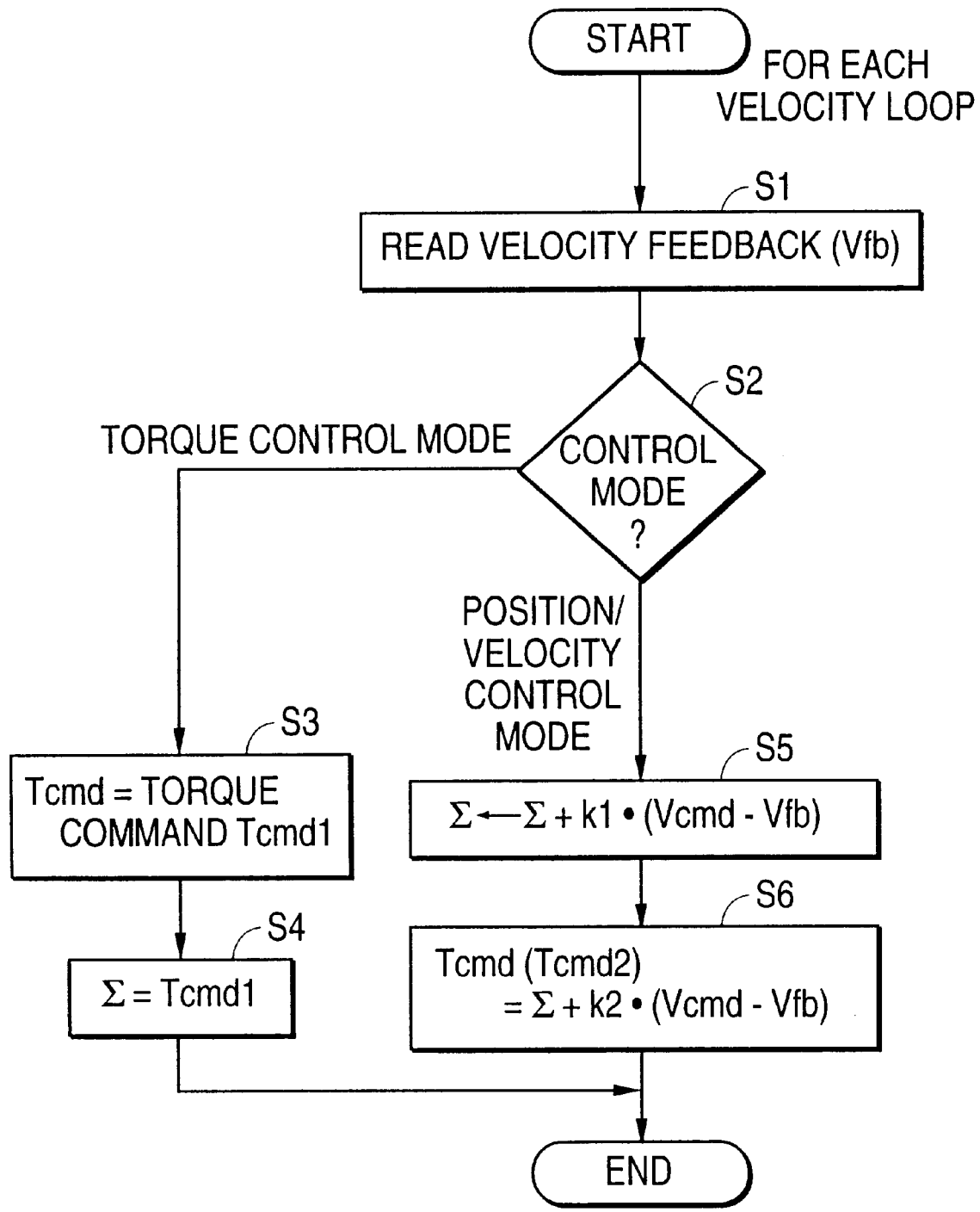

VALUE OF INTEGRATOR

TORQUE CONTROL MODE ← | → POSITION/VELOCITY CONTROL MODE

CHANGING OVER POINT

Tcmd

FIG. 5a
VALUE OF INTEGRATOR
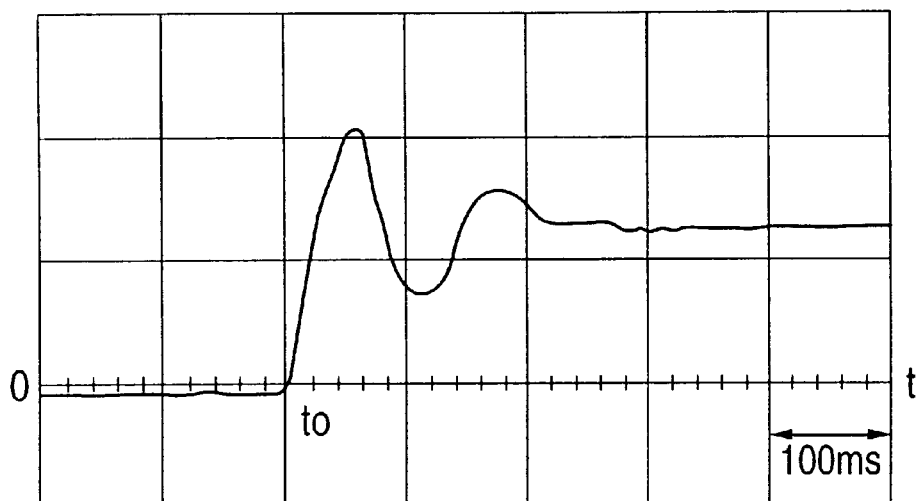
TORQUE CONTROL MODE | POSITION/VELOCITY CONTROL MODE
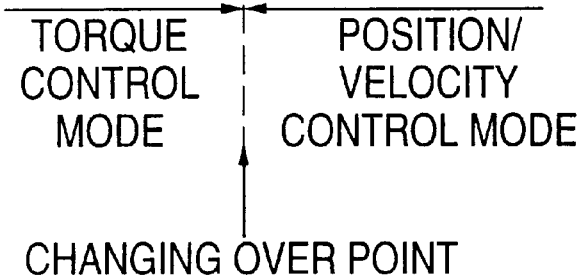
CHANGING OVER POINT
FIG. 5b
Tcmd
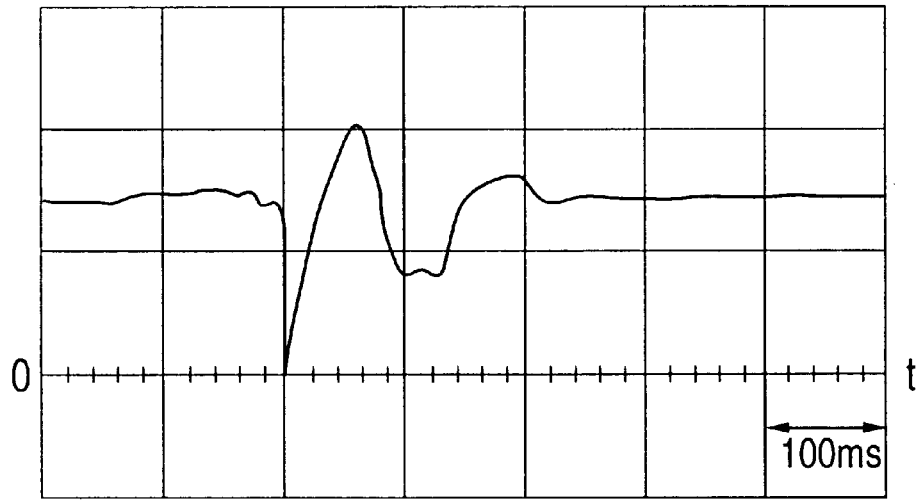

CONTROL MODE CHANGING OVER METHOD FOR SERVO CONTROL SYSTEM

TECHNICAL FIELD

The present invention relates to a servo control system for controlling a servo motor, and in particular, to a method of changing over a control mode of the servo control system from a torque control mode to a position/velocity control mode.

BACKGROUND ART

In controlling a servo motor for driving a feed shaft of a machine tool, an arm of a robot, etc., there are a case where the servo motor is controlled in a position/velocity control mode for controlling a position and a velocity, and a case where the servo motor is controlled in a torque control mode for controlling a force. The torque control mode is for making a servo motor output a torque commanded by a controller to provide an object driven by the servo motor with a force according to the command. The torque control mode is adopted in carrying out an operation for giving a constant tension to an object, an operation for pressing an object and an operation for fitting an object having indefinite profile, for example.

The position/velocity control mode and the torque control mode are often used in combination. For example, these modes are combined in a manner such that an object driven by the servo motor is moved to a specified position in the position control mode, the torque is controlled at the specified position in the torque control mode, and the object is moved again in the position control mode.

In the case where the servo motor is controlled by the combination of the position/velocity control mode and the torque control mode, the control mode is changed over between the above two control modes. When the control mode is changed in moving the movable part of the machine driven by the servo motor, a shock occurs inevitably. Thus, the changing over of the control mode is usually carried out when the movable part is stopped. In the above conventional change-over method, however, when a control mode is changed over from the torque control mode to the position/velocity control mode, an object of control may receive a shock due to discontinuity of a torque command value.

FIG. 6 shows a conventional servo control system for controlling a servo motor by changing over the control mode. In FIG. 6, the servo motor is controlled based on either a torque command Tcmd1 or a position command from a CNC. When controlling the servo motor based on the torque command Tcmdl from the CNC, a switch 5 is changed over to a torque command side to set the torque command Tcmd1 as a torque command Tcmd to the servo motor. When controlling the servo motor based on a position command, the position command is processed by a position control loop 6 and a velocity control loop 7 to obtain a torque command Tcmd2, and the switch 5 is changed over to a position command side to set the torque command Tcmd2 as a torque command Tcmd to the servo motor.

In the above conventional servo motor control, when the control mode is changed over from the torque control mode to the position/velocity control mode, a value of the torque command Tcmd for the servo motor differs before and after the changing over, to cause the discontinuity of the value of the torque command Tcmd so that a shock may be applied to the object of control.

Conventionally, the shock in the changing over may be allowed or there has been taken a measure for reducing the shock by carrying out servo control in the position/velocity control mode after setting a torque command in the torque control mode to "0" in changing over the control mode. This method, however, could not sufficiently eliminate the shock in changing over the control mode.

DISCLOSURE OF INVENTION

An object of the present invention is to reduce the discontinuity of the torque command value for the servo motor to sufficiently lower the shock in changing over the control mode from the torque control mode to the position/velocity control mode in controlling a servo system using the servo motor.

A control mode change-over method of a servo control system of the present invention includes rewriting a value of an integrator provided in a velocity loop to a torque command for a torque control, when the servo control system is operating in a torque control mode and obtaining a torque command value for the servo motor using the rewritten value of the integrator in changing over the control mode from the torque control mode to a position/velocity control mode.

According to the above-mentioned method, a continuous torque command value can be given to the servo motor when changing over the control mode, thereby sufficiently reducing the shock due to the discontinuity of the torque command value.

BRIEF DESCRIPTION OF DRAWINGS

FIG. 3 is a flowchart showing control mode changing over processes to be executed by a digital servo circuit of the control device shown in FIG. 2;

FIG. 5a is a graph showing a change in a value of an integrator in the case where control is carried out according to the conventional control mode changing over method;

FIG. 5b is a graph showing a change in a torque command Tcmd; and

Best Mode for Carrying Out the Invention

Figure 1:
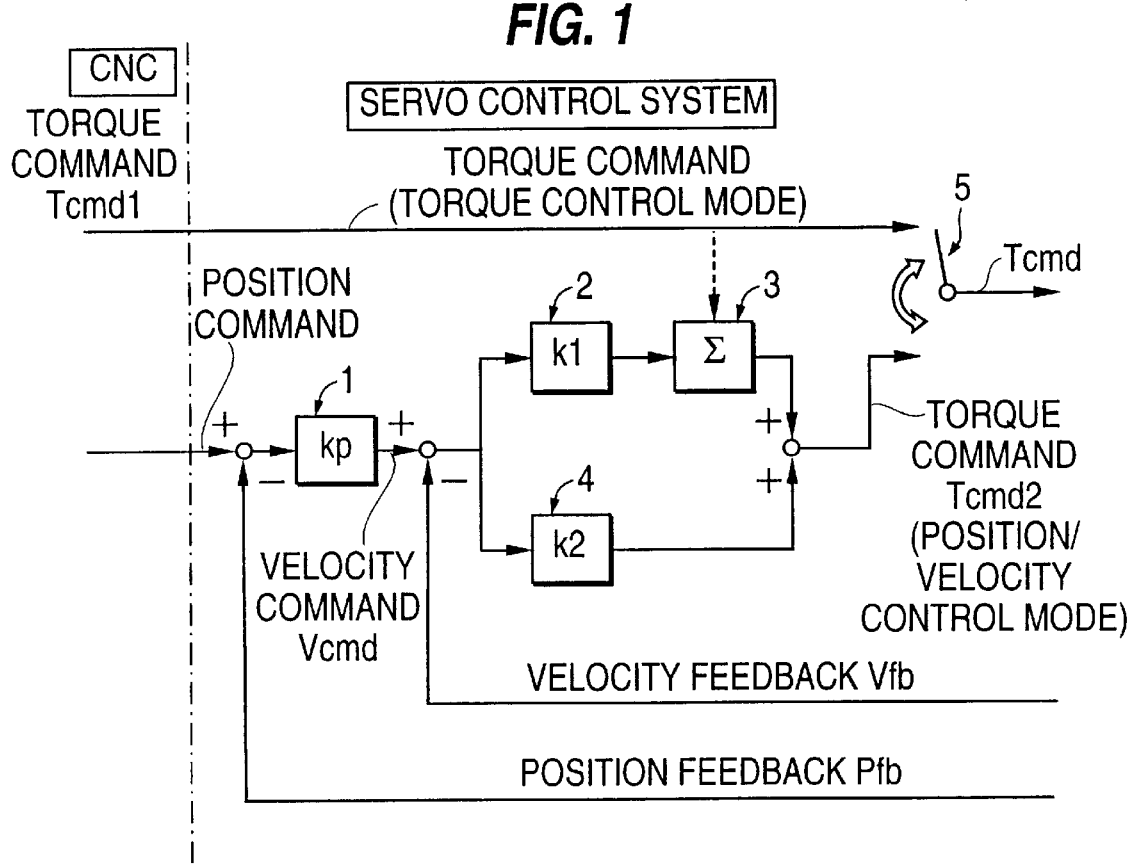
FIG. 1 is a block diagram of a servo control system for carrying out a control mode changing over method according to the present invention.

A servo control system shown in FIG. 1 controls a servo motor based on a torque command Tcmd1 or a motion command Mcmd from a computerized numerical control device (CNC). In FIG. 1, kp of a transfer function 1 represents a position gain of a position control loop, transfer functions 2 and 3 represent integral terms respectively, and the transfer function 3 denotes an integrator. A transfer function 4 represents a proportional term of a velocity control loop, k1 is an integral gain, and k2 is a proportional gain. A switch 5 executes a change-over between a torque control mode and a position/velocity control mode.

The torque command Tcmd1 or the motion command Mcmd is given to the servo control system from the CNC for each predetermined distribution period. When the torque command Tcmd1 is distributed from the CNC to carry out the control in the torque control mode, the switch 5 is changed over to a torque control mode side so that the torque command Tcmd1 is set as a torque command to the servo motor, and then, the servo motor is driven by a servo amplifier comprising an inverter (not shown), etc.

On the other hand, when the motion command Mcmd from the CNC is distributed, the motion command is divided into position commands for each position and velocity control loop processing periods. A position feedback Pfb is subtracted from the position command for each position and velocity control loop processing periods to obtain a positional deviation. The positional deviation is multiplied by a position gain kp in the transfer function to obtain a velocity command Vcmd. A velocity feedback Vfb, which represents an actual velocity of the servo motor, is subtracted from the calculated velocity command Vcmd to obtain a velocity deviation. And then, a value obtained in the integrator 3 by integrating the product obtained by multiplying the velocity deviation by integral gain k1 is added to a value obtained by multiplying the velocity deviation by the proportional gain k2, to obtain a torque command Tcmd2 in the position/velocity control mode. Subsequently, the switch 5 is changed over to the position/velocity control mode side, to output the torque command Tcmd2 as a torque command Tcmd for the servo motor, and the servo motor is driven by a servo amplifier including an inverter (not shown).

The above servo motor control is conventionally known, and can be carried out either by a servo control circuit comprising an analog circuit or by a digital control circuit by software processing of a processor.

According to the change-over method of the present invention,, a value stored in the integrator 3 is rewritten into the torque command Tcmdl when the servo control system is operating in a torque control mode, so that the value stored in the integrator always coincides with the torque command Tcmd1 in the torque control mode.

Figure 2:
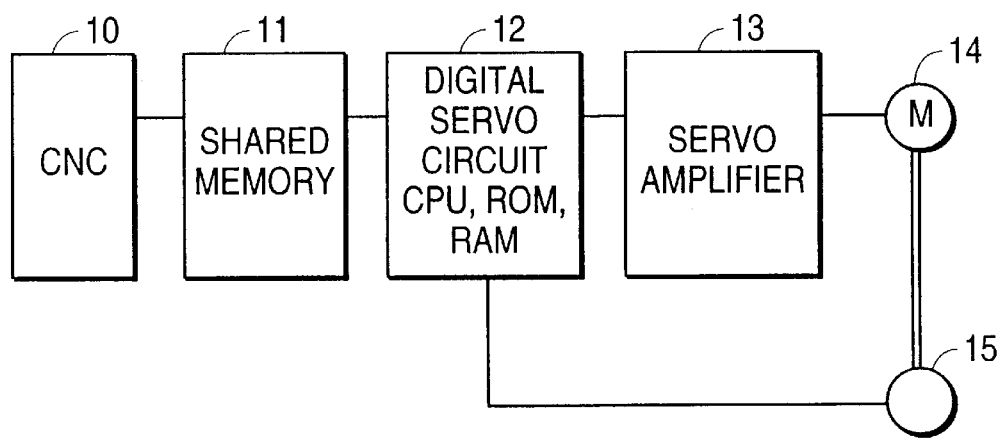
FIG. 2 is a block diagram showing principal parts of a control device for carrying out a control mode changing over method of the present invention.

FIG. 2 is a block diagram showing principal parts of the control device for carrying out the change-over method of the present invention. In FIG. 2, a servo motor M is used for driving a movable part of a machine tool or an axis of a robot. A shared memory 11 comprises a nonvolatile RAM, and is accessible for data exchange between processors of a CNC 10 and a digital servo circuit 12. The digital servo circuit 12 comprises a CPU, a ROM, a RAM, etc., and executes position and velocity control in a position/velocity control mode and torque control in a torque control mode. A servo amplifier 13 drives the servo motor 14 based on a command from the digital servo circuit 12. A pulse coder 15 feeds back the position feedback Pfb and the velocity feedback Vfb to the digital servo circuit 12.

The CNC 10 writes a motion command or a torque command in a shared RAM for each ITP period (distributing period). The processor of the digital servo circuit 12 reads the motion command or the torque command from the shared RAM, and executes a position/velocity control processing or a torque control processing for each of position and velocity control periods which is obtained by equally dividing the ITP period.

In the position/velocity control mode, the digital servo circuit 12 calculates a position command for position and velocity processing for each of position and velocity loop processing periods, and executes a position loop processing based on the calculated position command and the position feedback Pfb, to obtain a velocity command Vcmd. Subsequently, the digital servo circuit executes a velocity loop processing based on the velocity command Vcmd and the velocity feedback vcmd, to obtain the torque command Tcmd2.

In the torque control mode, the digital servo circuit 12 reads out the torque command Tcmd1 for each distributing period or for each position and velocity loop processing, and stores the torque command Tcmd1 in the integrator 3 in the velocity loop.

In each of the control modes, the digital servo circuit executes a current loop processing based on the calculated torque command Tcmd to form a PWM command, and drives the servo motor 14 through the servo amplifier.

Next, a control mode change-over method of the present invention will be described referring to FIG. 3 which shows a flowchart of processing to be executed by the digital servo circuit.

The digital servo circuit 12 reads the velocity feedback Vfb from the encoder 15 for each of position and velocity loop processing periods (Step S1). Further, the digital servo circuit 12 determines that the control should be carried out either in the torque control mode or in the position/velocity control mode, on the basis of data received CNC 10 through RAM 11 (Step S2). In the case of the torque control mode, the digital servo circuit executes processing of Steps S3 and S4, while in the case of the position/velocity control mode, the digital servo circuit executes processing of Steps S5 and S6.

If it is determined in Step S2 that the control mode is of the torque control, the digital servo circuit 12 outputs the torque command Tcmd1 as the torque command Tcmd for the servo motor to execute torque control (Step S3), and rewrites a value Σ stored in the integrator 3 in the velocity loop into a torque command Tcmd. The rewriting process of the integrator 3 is carried out for each position and velocity loop processing periods in the torque control mode. Therefore, during the torque control mode, the value Σ stored in the integrator 3 is updated for each position and velocity loop processing period, thereby making the value coincide with the torque command Tcmdl from the CNC (Step S4).

If it is determined in Step S2 that the control mode is of the position/velocity control, the CPU of the digital servo circuit executes a position loop processing based on the position command and the position feedback Pfb, to obtain the velocity command Vcmd. Then, a deviation between the velocity command Vcmd and the position feedback Vfb is multiplied by the integral gain k1, and the product is added to the value Σ stored in the integrator 3 (Step S5). Thus, at the time of changing over the control mode from the torque control mode to the position/velocity control mode, the value Σ stored in the integrator 3 before the addition corresponds to a value stored in the torque control mode. The change-over from the torque control mode to the position/velocity control mode is carried out when the movable part of the machine driven by the servo motor is stopped. As the values of velocity and velocity deviation immediately after the changing over are small, it is not necessary to consider the influence of an output from the proportional term 4.

Subsequently, the deviation between the velocity command Vcmd and the position feedback Pfb is multiplied the proportional gain K2, and the product is added to the value of the integrator 3, which is obtained in Step S5, to produce the torque command Tcmd2 in the position/velocity control mode (Step S6). The torque command Tcmd2 is output as torque command Tcmd to the servo motor in order to execute the position and velocity control.

The digital servo circuit 12 makes the switch 5 to be changed over to the torque control mode for the control in the torque control mode, and makes the switch 5 to be changed over to the position/velocity control mode for the control in the position/velocity control mode.

Figure 4A:
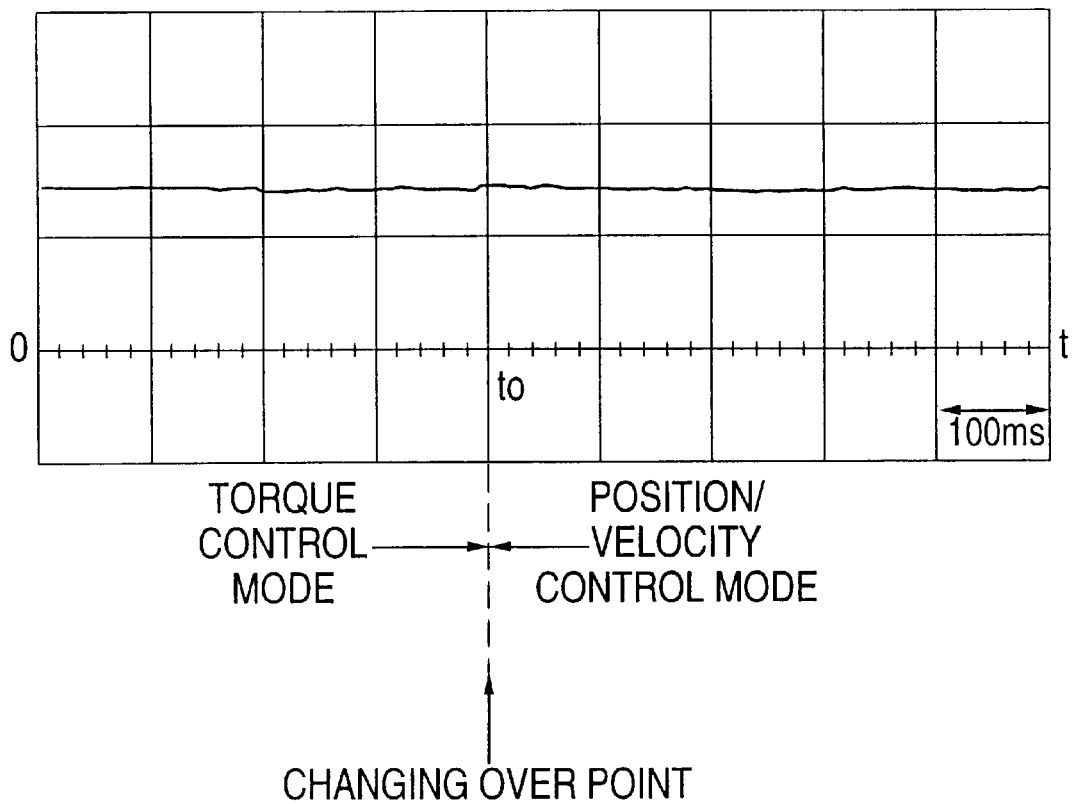
FIG. 4a is a graph showing a change in a value of an integrator in the case where control is executed according to the control mode changing over method of the present invention.
Figure 4B:
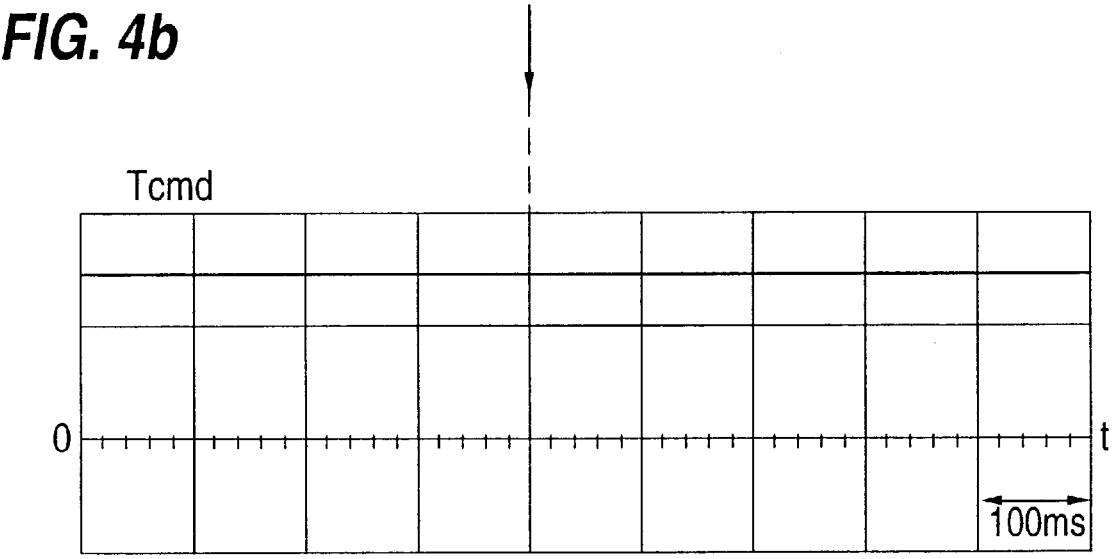
FIG. 4b is a graph showing a change in a torque command Tcmd.
Figure 6:
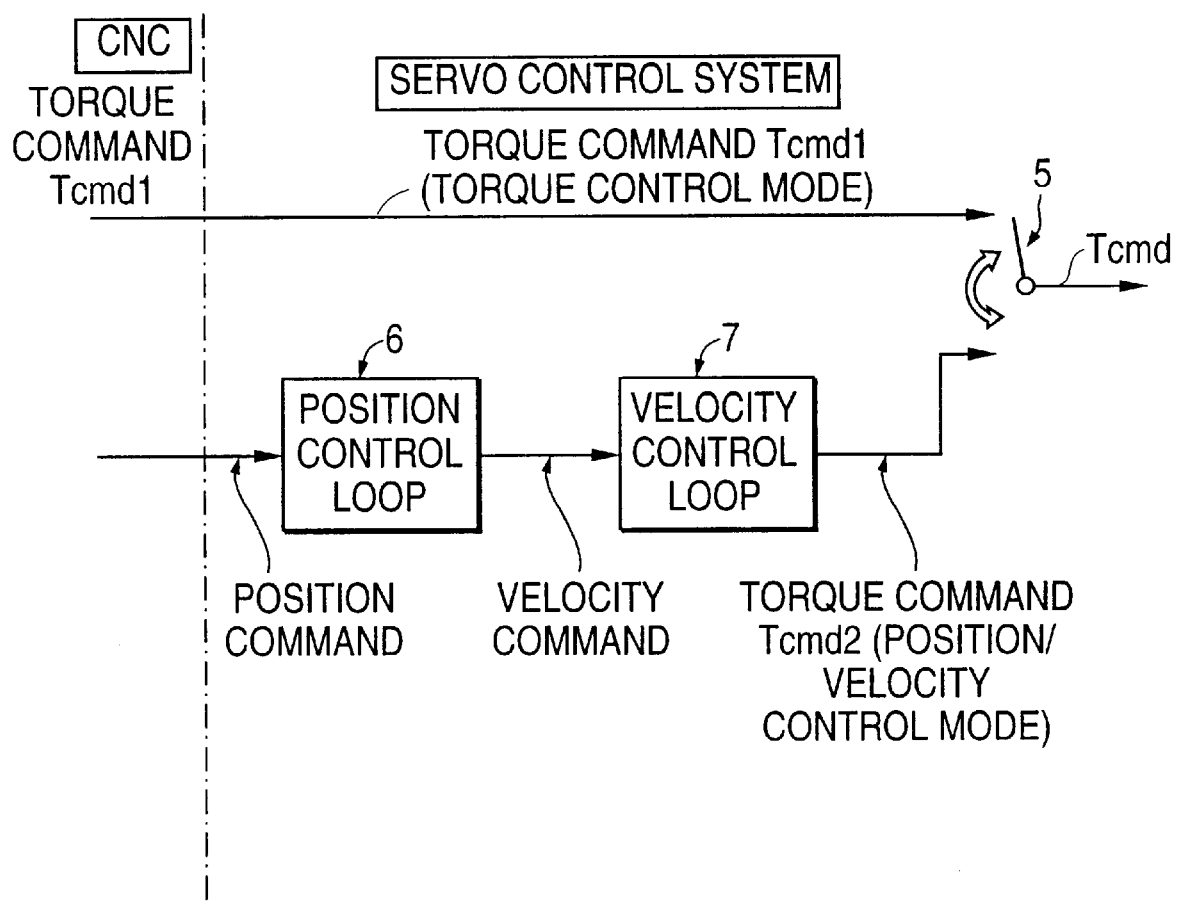
FIG. 6 is a block diagram of a conventional servo control system for controlling a servo motor according to the conventional control mode changing over method.

FIGS. 4a and 4b show a change in the value of the integrator and a change in the torque command Tcmd, respectively, in the case where servo control is carried out according to the control mode change-over method of the present invention. When a control mode is changed over from the torque control mode to the position/velocity control mode, no change occurs in the value of the integrator shown in FIG. 4a and the torque command Tcmd shown in FIG. 4b after the changing over point. This reduces a discontinuity of the torque command value in changing over the control mode, to thereby lower a shock occurring in changing over the control mode.

On the other hand, FIGS. 5a and 5b show a change in the value of the integrator and a change in the torque command Tcmd, respectively, in the case where servo control is carried out change-over the conventional control mode change-over method. As seen from the diagram of FIG. 5a, the value of the integrator is "0" in torque control mode, and when a control mode is changed over to the position/velocity control mode, a torque command Tcmd is produced after the transient response stage. As the value of the integrator varies at the time of the change-over, the torque command Tcmd discontinuously varies as seen from FIG. 5b, to cause a shock when the control mode is changed over.

As described above, the present invention is capable of reducing discontinuity of a torque command value for a motor when a control mode is changed over from a torque control mode to a position/velocity control mode, thereby adequately reducing a shock occurring in changing over the control mode.

We claim:

1. A control mode changing over method for a servo control system operable in either a torque control mode controlling a torque of a servo motor or a position/velocity control mode controlling a position and a velocity of a servo motor using a position loop and a velocity loop, comprising the steps of:

(a) rewriting a value stored in an integrator provided in said velocity loop to a torque command for torque control when said servo control system is operating in the torque control mode, such that the value stored in the integrator coincides with the torque command in the torque control mode; and (b) obtaining a torque command value for said servo motor using the value of said integrator rewritten in said step (a) when the control mode is changed from the torque control mode to the position/velocity control mode.

2. The control mode changing over method for a servo control system according to claim 1, wherein said step (a) further includes the step of rewriting the value of said integrator for each position and velocity loop processing.

3. A method for controlling a servo control system operating in a either a torque control mode or a position/velocity control mode, comprising the steps of:

rewriting a value stored in an integrator into a torque command when the servo control system is operating in the torque control mode, such that the value stored in the integrator coincides with the torque command in the torque control mode; and outputting a torque command value using the value rewritten in the integrator when the control mode is changed from the torque control mode to the position/velocity control mode.

4. A servo control system for controlling a machine tool or robot, comprising:

a motor driving one of a movable part of the machine tool and an axis of the robot;

a device writing a command for predetermined distribution periods;

a circuit executing position and velocity control in a position/velocity control mode and torque control in a torque control mode;

a memory storing the command for exchange between the device and the circuit; and an amplifier driving the motor based on the command from the circuit, wherein the command coincides with a torque command in the torque control mode.

5. A servo control system for controlling a servo motor in a torque control mode or a position/velocity control mode, comprising:

an integrator rewriting a value stored therein to a torque command for torque control when the system is operating in the torque control mode, and obtaining a torque command value using the value rewritten in the integrator such that the value stored in the integrator coincides with the torque command in the torque control mode; and a switch determining the control mode and outputting the torque command for the servo motor, driving the servo motor.

* * * * *